(Model.)

W. A. NETTLETON.
Corset Fastener.

No. 238,147. Patented Feb. 22, 1881.

Witnesses
Wm. W. Mortimer
Will H. Kern

Inventor
W. A. Nettleton
per
F. A. Lehmann,
Atty.

UNITED STATES PATENT OFFICE.

WILLIAM A. NETTLETON, OF BRIDGEPORT, CONNECTICUT.

CORSET-FASTENER.

SPECIFICATION forming part of Letters Patent No. 238,147, dated February 22, 1881.

Application filed January 4, 1881. (Model.)

*To all whom it may concern:*

Be it known that I, WILLIAM A. NETTLETON, of Bridgeport, in the county of Fairfield and State of Connecticut, have invented certain new and useful Improvements in Corset-Fasteners; and I do hereby declare the following to be a full, clear, and exact description of the invention, such as will enable others skilled in the art to which it pertains to make and use it, reference being had to the accompanying drawings, which form part of this specification.

My invention relates to an improvement in corset-fasteners; and it consists in the combination of a slotted plate, having an eye made at the outer end of the slot large enough for the fastening-pin to pass through, with a flat spring, which is secured upon the top of the plate and which has an indentation in its under side just over the eye, and a hole made through it just over the inner end of the slot, so that the top of the fastening-pin will engage in it, and of a fastening-pin having two grooves opposite each other in its sides in place of the head hitherto used, so that it will slide in the slotted plate, the edges of the slot fitting into the grooves in the pin, and so made that it will project only slightly beyond the flat spring in which it engages, as will be more fully described hereinafter.

The object of my invention is to provide a safety attachment for the fastenings of corsets which will prevent the fastenings from becoming undone, and in which the fastening-pin shall not project far enough to catch in the clothing, as it does in the old style of fastening.

Figure 1:
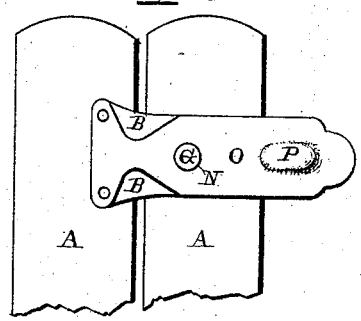
Figure 2:
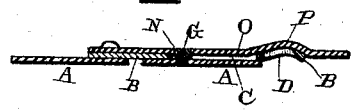
Figure 3:
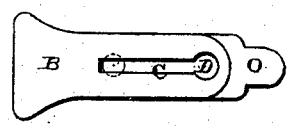
Figure 4:

Figure 1 is a plan view of a fastening embodying my invention. Fig. 2 is a horizontal section of the same. Fig. 3 is a view taken from the inside of the fastener. Fig. 4 is a side view of the fastening-pin.

A represents the two steels of the corset, to one of which is secured the flat plate B, which has a horizontal slot, C, made through it, and the eye D made through its outer end at the end of the slot, for the grooved pin G to pass through. The inner side of this plate, around the outer edge of the eye D, is beveled away or pressed upward in such a manner that the top of the pin G will readily pass through the eye into the slot. The pin G has a groove cut in each side, so that after the top of the pin has been passed through the eye the pin can be pushed along to the inner end of the slot.

Fastened to the outer side of the slotted plate by means of the same rivets which fasten the plate to the steel A is the spring O, which extends some distance beyond the outer end of the plate. In the under side of this spring, just over the eye D, is made a recess, P, of sufficient depth to allow the top of the pin to freely pass through the eye into the slot. Also made through this spring, just over the inner end of the slot, is an eye, N, up through which the top of the pin passes when it has reached the inner end of the slot. This spring bears upon the top of the slotted plate with just sufficient force to allow the pin to be easily pushed along under it, and when the top of the pin enters the eye N the spring catches behind the top of the pin, so as to prevent the pin from being drawn out of the plate B and the fastening of the corset from becoming loose. When it is desired to loosen the fastening it is only necessary to pull upward upon the outer end of the spring, so as to free the top of the pin from the eye N, when the pin will at once slip out of the slot freely. This spring not only serves to prevent the pin from coming out of the slot, but also serves to cover over so much of the pin that it will not project far enough to catch in the clothing.

I am aware that it is not new to use a spring for the purpose of preventing a corset-fastening from becoming loose, and this I disclaim.

Having thus described my invention, I claim—

1. In a corset-fastener, the combination of the steel A, the plate B, having the eye D through its outer end, and a slot, C, extending inward from the eye, with the spring having the recess P and eye N, and the pin G, having a groove in each side, the parts being arranged and adapted to operate substantially as shown and described.

2. In a corset-fastener, the combination of the flat plate B, provided with the slot C, having the opening D through its outer end, with the spring O, having the opening N over the small end of the slot C to allow the head of the pin G to pass through, substantially as described.

In testimony that I claim the foregoing I have hereunto set my hand this 27th day of December, 1880.

WILLIAM ALFRED NETTLETON.

Witnesses:
 D. W. ROCKWELL,
 F. J. HUGHES.